United States Patent
Karasawa et al.

(10) Patent No.: US 9,089,935 B2
(45) Date of Patent: Jul. 28, 2015

(54) MANUFACTURING APPARATUS FOR FLATTENED TUBE FINS

(71) Applicant: Hidaka Seiki Kabushiki Kaisha, Tokyo (JP)

(72) Inventors: Masanao Karasawa, Tokyo (JP); Toshiyuki Nanaarashi, Tokyo (JP)

(73) Assignee: Hidaka Seiki Kabushiki Kaisha, Tokyo (JP)

( * ) Notice: Subject to any disclaimer, the term of this patent is extended or adjusted under 35 U.S.C. 154(b) by 253 days.

(21) Appl. No.: 13/788,576

(22) Filed: Mar. 7, 2013

(65) Prior Publication Data

US 2014/0060142 A1   Mar. 6, 2014

(30) Foreign Application Priority Data

Aug. 30, 2012 (JP) .................................. 2012-190505

(51) Int. Cl.
*B23P 15/26* (2006.01)
*B21D 53/02* (2006.01)

(52) U.S. Cl.
CPC .............. *B23P 15/26* (2013.01); *B21D 53/022* (2013.01)

(58) Field of Classification Search
CPC .... B21D 43/12; B21D 43/282; B21D 43/285; B21D 43/287; B21D 53/022; B23P 15/26; B23P 15/28; B21K 27/04
USPC .................. 72/428, 405.01, 405.06
See application file for complete search history.

(56) References Cited

U.S. PATENT DOCUMENTS 3,722,251 A * 3/1973 Withrow .......................... 72/294
5,349,841 A   9/1994 Honma et al.

FOREIGN PATENT DOCUMENTS

| JP | 04-367317 A | 12/1992 |
| JP | 5-192728 A | 8/1993 |
| JP | 6-211394 A | 8/1994 |
| WO | WO 2012/098916 A1 | 7/2012 |

* cited by examiner

*Primary Examiner* — Teresa M Ekiert
(74) *Attorney, Agent, or Firm* — Birch, Stewart, Kolasch & Birch, LLP

(57) ABSTRACT

A manufacturing apparatus that manufactures flattened tube fins includes: a press apparatus equipped with a mold apparatus that forms cutaway portions in a thin metal plate to produce a metal strip; an inter-row slit apparatus cutting the metal strip into predetermined widths to form metal strips of a product width; a cutoff apparatus that cuts the metal strips of the product width into predetermined lengths to obtain flattened tube fins; and a metal strip guide which is disposed between the inter-row slit apparatus and the cutoff apparatus and supplies the metal strips of the product width to the cutoff apparatus in a state where the metal strips are separated from one another.

6 Claims, 11 Drawing Sheets

CONVEYING DIRECTION

CONVEYING DIRECTION →

PRODUCT WIDTH DIRECTION

MANUFACTURING APPARATUS FOR FLATTENED TUBE FINS

CROSS-REFERENCE TO RELATED APPLICATION(S)

This application is based upon and claims the benefit of priority of the prior Japanese Patent Application No. 2012-190505, filed on Aug. 30, 2012, the entire contents of which are incorporated herein by reference.

FIELD

The present invention relates to a manufacturing apparatus for flattened tube fins and in more detail to a manufacturing apparatus for flattened tube fins that prevents deformation during conveying of metal strips of a product width, which are preforms of the flattened tube fins, and thereby has no manufacturing loss.

BACKGROUND

An existing heat exchanger, such as an air conditioner, is typically constructed by stacking a plurality of heat exchanger fins, in which a plurality of through-holes have been formed to enable heat exchanger tubes to be inserted. Such heat exchanger fins are manufactured by a manufacturing apparatus for heat exchanger fins depicted in FIG. 12. The manufacturing apparatus for heat exchanger fins is equipped with an uncoiler 12 where a thin metal plate 10 made of aluminum or the like has been wound into a coil. The thin plate 10 pulled out from the uncoiler 12 via pinch rollers 14 is inserted into an oil applying apparatus 16, where machining oil is applied onto the surface of the thin plate 10, and is then supplied to a mold apparatus 20 provided inside a press apparatus 18.

The mold apparatus 20 internally includes an upper mold die set 22 that is capable of up-down movement and a lower mold die set 24 that is static. A plurality of collar-equipped through-holes (not illustrated), where collars of a predetermined height are formed around through-holes, are formed at predetermined intervals in a predetermined direction by the mold apparatus 20. The result of machining the thin metal plate to produce the through-holes and the like is hereinafter referred to as the "metal strip 11".

The metal strip 11 that is machined here is formed with a plurality of heat exchanger fins as the final products aligned in the width direction. For this reason, an inter-row slit apparatus is provided inside the mold apparatus 20. In the inter-row slit apparatus, an intermittently fed metal strip 11 is cut by upper blades and lower blades coming together so as to manufacture products (referred to below as "metal strips of the product width") in the form of long strips in the conveying direction.

The metal strips of the product width are cut into predetermined lengths by a cutter 26. The products that have been cut into the predetermined lengths (i.e., the heat exchanger fins) are then stacked in a stacker 28. The stacker has a plurality of pins 27 that are erected in the perpendicular direction and stacks the manufactured heat exchanger fins with the pins 27 inserted into the through holes.

Patent Document 1
    Japanese Laid-Open Patent Publication No. H06-211394

SUMMARY

In recent years, heat exchangers that use multi-channel flattened tubes have been developed. Plan views of a metal strip 11 on which a plurality of heat exchanger fins (hereinafter sometimes referred to as "flattened tube fins") that use flattened tubes and flattened tube fins 30 obtained by separating the metal strip 11 are depicted in FIGS. 13A and 13B.

On a flattened tube fin 30, cutaway portions 34 into which flattened tubes are inserted are formed at a plurality of positions, and plate-like portions 36, where louvers 35 are formed, are formed between cutaway portion 34 and cutaway portion 34. The cutaway portions 34 are formed from only one side in the width direction of a flattened tube fin 30. Accordingly, the plurality of plate-like portions 36 between cutaway portion 34 and cutaway portion 34 are joined by a joining portion 38 that extends along the length direction of the flattened tube fin 30.

However, in a manufacturing apparatus that manufactures flattened tube fins, at the cutoff apparatus that forms the heat exchanger fins as the final products by cutting the metal strips of product width into predetermined lengths, to enable the lengths of the products to be arbitrarily changed, it is possible to set the feeding length per single cutoff operation longer than the feeding length of the metal strips of product length per operation of the press apparatus (that is, per closing of the mold). For this reason, investigations are being conducted into allowing the metal strips of product width to sag downward so that a length that is longer than the length of one feeding operation by the cutoff apparatus can be temporarily held between the press apparatus and the cutoff apparatus.

However, since the metal strips of product width are formed extremely thinly, there is the risk of the metal strips of product width contacting one another at locations where the strips sag downwards. When the metal strips of product width have had a predetermined thickness, it has not been especially problematic for the metal strips of product width to contact one another. However, as the thickness of the metal strips of product width is reduced, contact between the metal strips of product width during conveying between the inter-row slit apparatus and the cutoff apparatus can easily cause deformation, especially at parts beside the openings of the cutaway portions 34 of the metal strips of product width, resulting in the problem of a clearly observable increase in a manufacturing loss for flattened tube fins.

The present invention was conceived to solve the above problem and has an object of providing a manufacturing apparatus for flattened tube fins that can assist conveying from the inter-row slit apparatus to the cutoff apparatus and prevents a manufacturing loss by avoiding contact between the metal strips of the product width.

By conducting extensive research into solving the stated problem, the present inventors conceived the following construction. A manufacturing apparatus manufactures flattened tube fins in which cutaway portions, into which flattened tubes for heat exchanging are inserted, are formed from one side toward another side in a width direction, the manufacturing apparatus including: a press apparatus equipped with a mold apparatus that forms the cutaway portions in an unmachined thin plate of metal to produce a metal strip; an inter-row slit apparatus which cuts the metal strip, in which the cutaway portions have been formed, into predetermined widths to form a plurality of metal strips of a product width that are arranged in the width direction; a cutoff apparatus that cuts each of the plurality of metal strips of the product width into predetermined lengths to obtain flattened tube fins; and a metal strip guide which is disposed between the inter-row slit apparatus and the cutoff apparatus and supplies the respective metal strips of the product width that have been formed by the inter-row slit apparatus to the cutoff apparatus in a state where the metal strips are separated from one another. By doing so, it is possible to avoid contact between the metal strips of the product width during conveying from the inter-row slit apparatus to the cutoff apparatus and, by preventing a manufacturing loss due to deformation of the metal strips, possible to improve the manufacturing efficiency of the flattened tube fins.

The metal strip guide may preferably supply the metal strips of the product width to the cutoff apparatus in a state where sides of the metal strips where the cutaway portions are open are separated from one another. By doing so, when the metal strips of the product width contact one another, since there will be no contact between the sides of the metal strips of the product width where the cutaway portions are open and which are most susceptible to deformation, it is possible to reliably prevent deformation of the parts beside the openings of the cutaway portions.

The metal strip guide may preferably include: paths that are formed on inclined surfaces provided with an apex on a side of the metal strips of the product width formed by the inter-row slit apparatus where the cutaway portions are formed and inclined downward from the apex in directions that are perpendicular to a supplying direction of the metal strips of the product width, the inclined surfaces being formed wider than the product width of the metal strips of the product width; and wall portions that are erected from ends in a width direction of the paths. By using this construction, it is possible to realize the metal strip guide with a simple construction.

The wall portions may preferably be provided at positions that contact edges of the metal strips of the product width where the cutaway portions are not formed. By doing so, since it is possible to guide the metal strips in the conveying direction by having a part that is most resistant to deformation out of the metal strips contact the wall portion, it is possible to reliably avoid the risk of deformation due to the side where the cutaway portions are open and is susceptible to deformation colliding with something. Since the center of gravity of a metal strip of the product width is off-center toward the side where cutaway portions are not formed, positioning the side where the cutaway portions are not formed on the wall portion side (i.e., the lower side of the inclined surfaces) is also favorable when the metal strips slide down the inclined surfaces that are the paths.

An angle of inclination of the inclined surfaces with respect to a horizontal plane may preferably be in a range of 5° to 45°. By using this construction, it is possible for the metal strips of the product width to slide down the upper surface of the path under the effect of gravity only and possible to have the parts of the metal strips that are most resistant to deformation contact the wall portions.

In addition, the metal strip guide may preferably supply the metal strips of the product width to the cutoff apparatus at positions that are separated in at least one direction out of a height direction and a width direction for the cutoff apparatus. By using this construction, it is possible to supply the metal strips formed at the product width to the cutoff apparatus in a state where the metal strips are reliably separated from one another, even if it is just a minute space.

A plurality of the metal strip guides may preferably be provided. By doing so, since it is possible for the width of separation between the metal strips to gradually widen, it is possible to reduce the load on the metal strips of the product width produced when the metal strips of the product width are separated.

With the manufacturing apparatus for flattened tube fins according to the present invention, it is possible, during conveying between an inter-row slit apparatus and a cutoff apparatus, to supply metal strips of the product width in a separated state to the cutoff apparatus, which means that it is possible to avoid contact between the metal strips of the product width and thereby prevent a manufacturing loss due to deformation of the metal strips of the product width.

DESCRIPTION OF EMBODIMENT(S)

Figure 1:
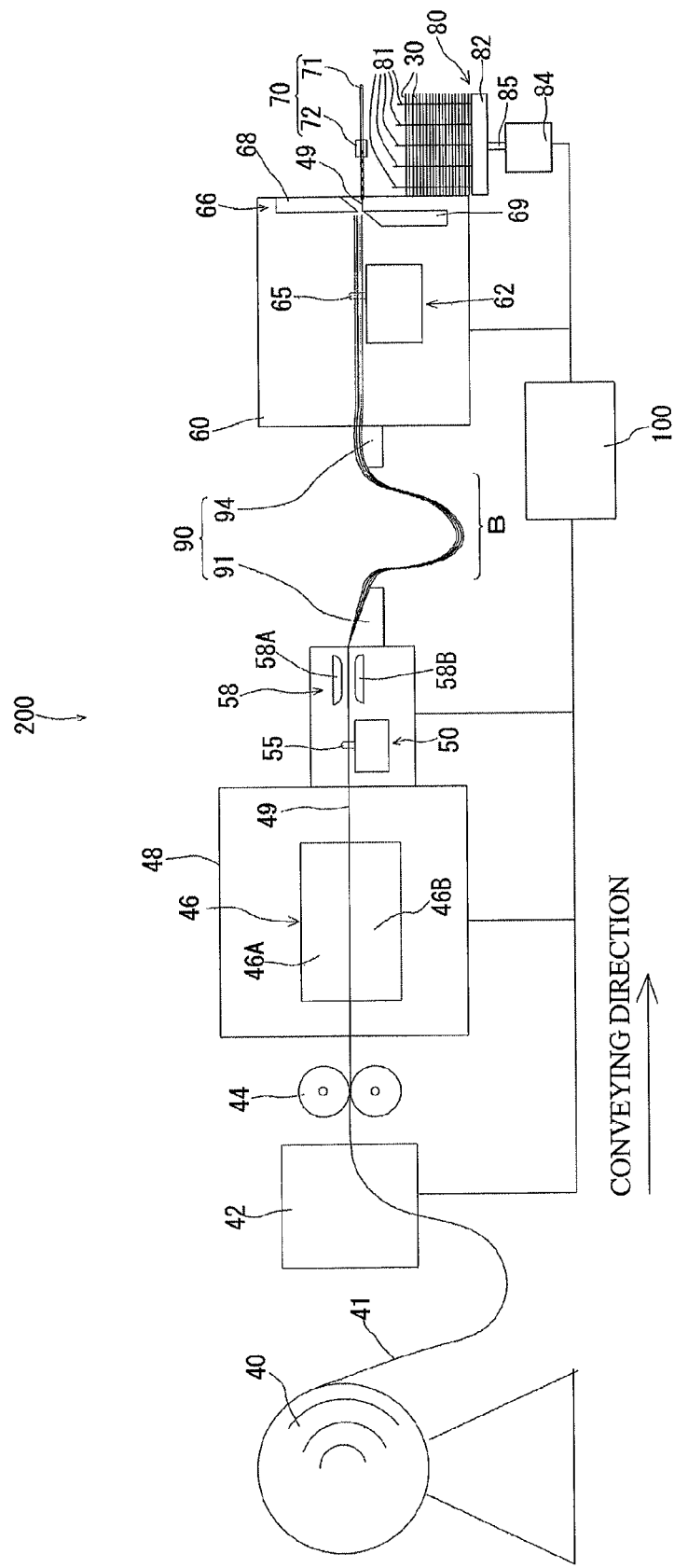
FIG. 1 is a diagram depicting the overall construction of a manufacturing apparatus for flattened tube fins according to an embodiment of the present invention.
Figure 2:
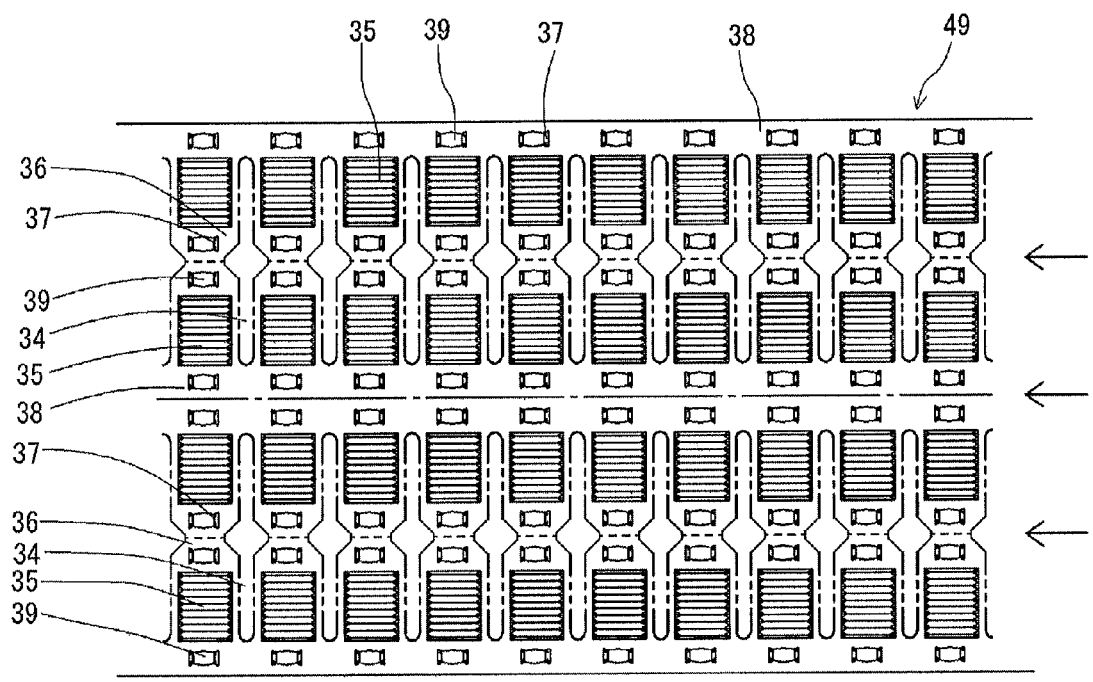
FIG. 2 is a plan view of a metal strip that is a preform for flattened tube fins.

As depicted in FIG. 1, in a manufacturing apparatus 200 for flattened tube fins according to the present embodiment, a thin metal plate 41, which is the raw material, is wound out from an uncoiler 40 and supplied via a loop controller 42 and an NC feeder 44 to a press apparatus 48. Due to press machining by a mold apparatus 46 for flattened tube fins, the thin metal plate 41 is formed into a metal strip 49 as depicted in FIG. 2. The NC feeder 44 is composed of two rollers that touch the upper surface and the lower surface of the thin metal plate 41, and by rotationally driving the two rollers, the thin metal plate 41 is sandwiched and intermittently fed. Fluctuations in the intermediate feeding of the thin metal plate 41 supplied in this way are suppressed by the loop controller 42.

The mold apparatus 46 for flattened tube fins (hereinafter simply "mold apparatus 46") according to the present embodiment is constructed of an upper mold 46A that is a first mold and a lower mold 46B that is a second mold provided so as to be free to open and close due to at least one of the molds moving toward and away from the other. By passing the thin metal plate 41 through the mold apparatus 46 where the molds move in this way so as to press the thin metal plate 41, cutaway portions 34 which are formed from one side in the width direction of the thin metal plate 41 toward the other side and into which flattened tubes for heat exchanging are inserted, folded-up portions 37 formed by cutting and folding up parts of the thin metal plate 41, through-holes 39 that are marks (i.e., holes) formed by the folding up of the folded-up portions 37, and louvers 35 are formed.

Since the fundamental construction of the flattened tube fins 30 obtained by cutting the metal strips 49 into predetermined dimensions is described earlier in the "BACKGROUND" section, detailed description of parts that are common to the constructions of the flattened tube fins 30 and the metal strips 49 is omitted here. As depicted in FIG. 2, the metal strip 49 depicted in FIG. 2 has four products (flattened tube fins 30) formed in a line in the width direction that is perpendicular to the conveying direction of the metal strip 49. The metal strip 49 has the cutaway portions 34, into which the flattened tubes will be inserted, formed in the width direction of the thin metal plate 41 that is the raw material at a plurality of positions predetermined intervals apart along the conveying direction of the metal strip 49. Plate-like portions 36, where the louvers 35 are formed, are formed between cutaway portion 34 and cutaway portion 34. The folded-up portions 37, which are formed by cutting and folding up parts of the plate-like portions 36, and the through-holes 39 are formed at both ends in the width direction of the louvers 35.

The cutaway portions 34 are formed from only one side in the width direction of the metal strips 49 toward the other side. Accordingly, the plurality of plate-like portions 36 between cutaway portion 34 and cutaway portion 34 are continuously joined by a joining portion 38 that extends along the length direction. Out of the two folded-up portions 37 for one louver 35 described above, one folded-up portion 37 is formed at a position on the joining portion 38.

On the metal strip 49 in FIG. 2, two products (flattened tube fins 30) disposed with the open ends of the cutaway portions 34 adjacent to one another form a pair, and two of such pairs are formed. That is, the pairs, in which the open ends of the cutaway portions 34 of two products are disposed facing one another, are placed so that the joining portions 38 thereof are adjacent. In this way, by disposing four products in an arrangement where a center line in the conveying direction is an axis of symmetry, the left-right load balance of the mold apparatus 46 is improved.

In the feeding apparatus 50, a reciprocating unit (not illustrated) that is capable of moving in the horizontal direction moves reciprocally between an initial position and a conveyed position to pull the metal strip 49. Feed pins 55 (see FIG. 1) that protrude upward are disposed on the upper surface of the reciprocating unit, the feed pins 55 advance from below into the cutaway portions 34 formed in the metal strip 49, and the metal strip 49 is fed out from the initial position to the conveyed position by pulling with the feed pins 55.

An inter-row slit apparatus 58 is provided downstream (i.e., downstream in the conveying direction of the metal strip 49) of the feeding apparatus 50 (see FIG. 1). The inter-row slit apparatus 58 includes upper blades 58A disposed on the upper surface side of the metal strip 49 and lower blades 58B disposed on the lower surface side of the metal strip 49. The inter-row slit apparatus 58 may be provided so as to operate using an up-down movement operation of the press apparatus 48. The upper blades 58A and the lower blades 58B are formed so as to be elongated in the conveying direction of the metal strip 49 and the intermittently fed metal strip 49 is cut by the upper blades 58A and the lower blades 58B coming together at the positions of the arrows in FIG. 2 so as to obtain products (referred to below as "metal strips 49A of the product width") in the form of long strips in the conveying direction.

The plurality of metal strips 49A of the product width that have been cut to the product width by the inter-row slit apparatus 58 are respectively fed into a cutoff apparatus 60 separately provided with a supplying unit. The metal strips 49A of the product width have a cantilever-like construction. For this reason, the parts beside the openings of the cutaway portions 34 that are the free ends of the metal strips 49A of the product width can deform by simply contacting one another, and therefore the conveying from the inter-row slit apparatus 58 to the cutoff apparatus 60 needs to be carried out carefully. In the present embodiment, a first metal strip guide 91, which is a device that assists the conveying, is used when conveying the metal strips 49A of the product width that have been cut to the product width by the inter-row slit apparatus 58 to the cutoff apparatus 60 so as to convey the metal strips 49A of the product width without the strips 49A contacting one another. By doing so, deformation due to contact between the metal strips 49A of the product width is prevented.

Figure 3A:
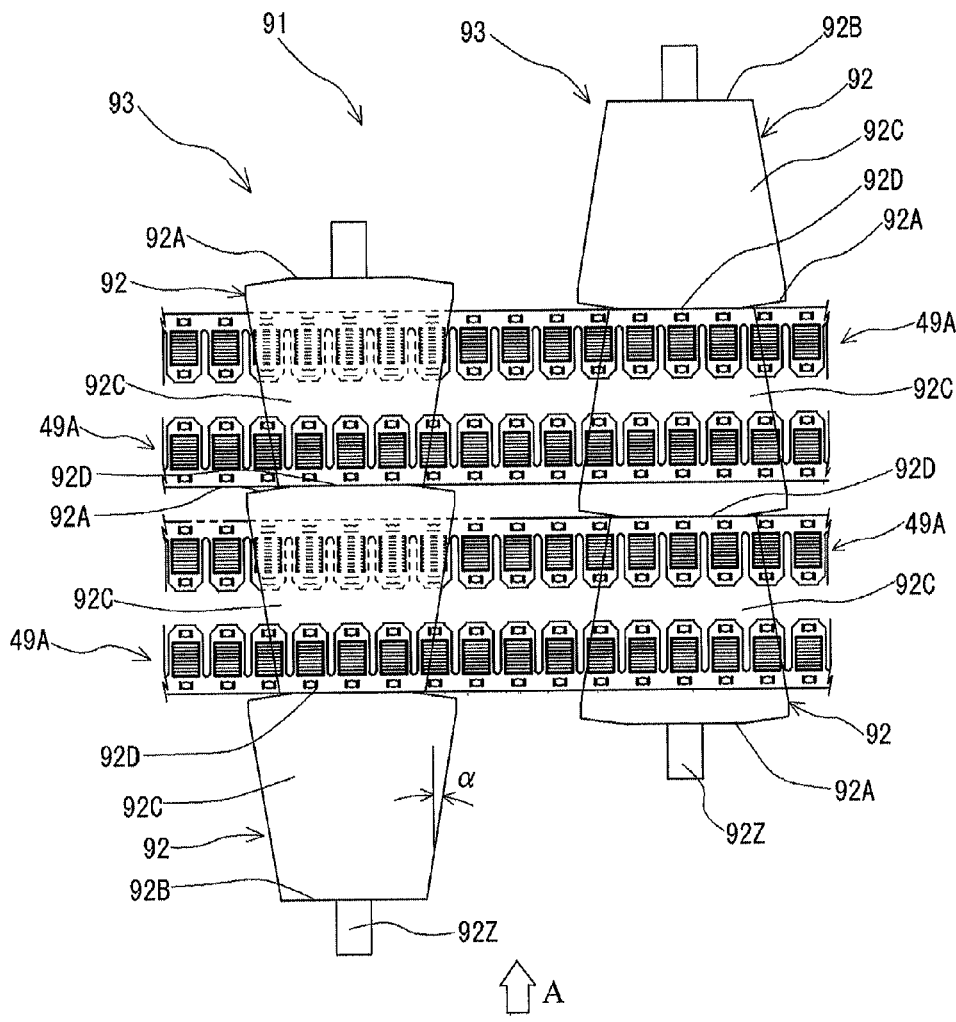
FIG. 3A is a plan view of a first metal strip guide and FIG. 3B is a front view of the first metal strip guide.
Figure 3B:
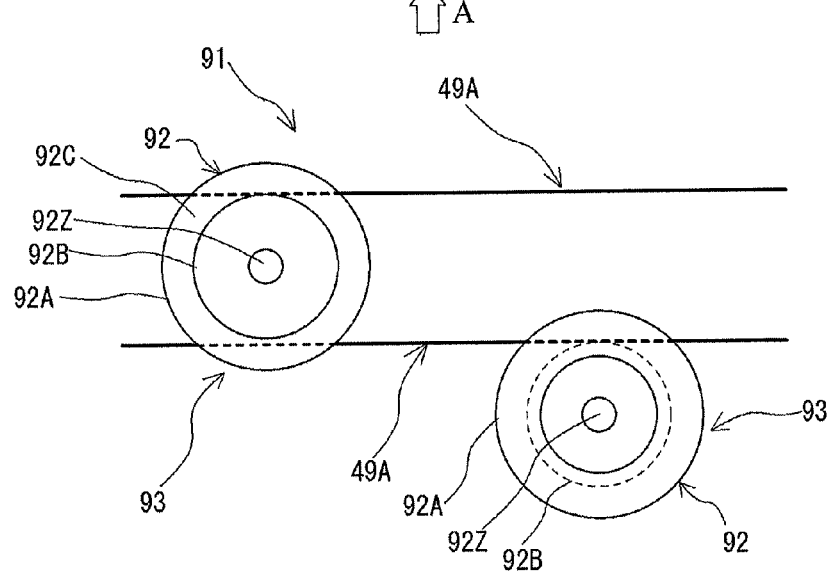

FIG. 3A is a plan view and FIG. 3B is a front view of the first metal strip guide 91 when looking from direction A in the FIG. 3A. As depicted in FIGS. 3A and 3B, the first metal strip guide 91 is composed of two guides 93, 93 where a plurality of truncated cone portions 92 are aligned so that large diameter parts 92A and small diameter parts 92B are adjacent to one another in the height direction. The two guides 93, 93 are disposed so that when viewed from above, the center axes 92Z (rotational axes) in the height direction of the truncated cone portions 92 are parallel and so that when viewed from the front, the center axes 92Z of the guides 93, 93 are at different positions in the height direction. The guides 93, 93 disposed in this way are capable of rotating along the conveying direction of the metal strips 49A of the product width with the center axes 92Z as the center of rotation.

The side circumferential surfaces 92C of the truncated cone portions 92 of the guides 93 are formed as inclined surfaces that serve as paths of the metal strips 49A of the product width. The width of the side circumferential surfaces 92C that are the paths is set according to the height of the truncated cone portions 92 and the angle of inclination of the generatrix (which is also the angle α of the inclined surface with respect to the horizontal plane). The width of the side circumferential surfaces 92C is also wider than the width of the metal strips 49A of the product width. The angle of inclination a of the side circumferential surfaces 92C should preferably be in a range of 5° to 45° with respect to the horizontal plane.

The metal strips 49A of the product width that have been cut to the product width by the inter-row slit apparatus 58 slide, under the effect of gravity alone, down the inclined surfaces of the side circumferential surfaces 92C, which are the paths, toward the small diameter parts 92B in a state where the joining portions 38 are at the front. Here, the reason that the joining portions 38 of the metal strips 49A of the product width are disposed on the small diameter parts 92B side of the side circumferential surfaces 92C of the truncated cone portions 92 that form the paths is to prevent deformation due to the parts beside the openings of the cutaway portions 34 contacting wall portions 92D.

Since the large diameter part 92A of the adjacent truncated cone portion 92 is present at the small diameter part 92B of a truncated cone portion 92 that is an end portion of a side circumferential surface 92C that forms a path, a wall portion 92D is formed due to the difference in diameters between the large diameter part 92A and the small diameter part 92B. Due to the joining portion 38 of a metal strip 49A of the product width that has slid downward across the side circumferential surface 92C contacting the wall portion 92D, it is possible to convey the metal strips 49A of the product width to the cutoff apparatus 60 in a state where a predetermined separation distance is maintained between the metal strips 49A of the product width.

In the present embodiment, the second and fourth metal strips 49A of the product width (in order moving downward from the top when the metal strip 49 depicted in FIG. 2 is separated into the metal strips 49A of the product width) are supplied to the guide 93 on the left that is on the upstream side in the conveying direction in FIG. 3 and the first and third metal strips 49A of the product width are supplied to the guide 93 on the right that is on the downstream side in the conveying direction in FIG. 3. By separating respectively adjacent metal strips 49A of the product width in this way in a zigzag arrangement in the horizontal direction and the height direction, it is possible to convey the metal strips 49A of the product width toward the cutoff apparatus 60 in a state where a sufficient separation distance can be achieved between respective strips 49A.

As described above, since sections of the plurality of metal strips 49A of the product width fed out from the inter-row slit apparatus 58 that are longer than the length of one feeding operation by the cutoff apparatus 60, described later, are temporarily held, the metal strips 49A of the product width are allowed to sag downward to form a buffer part B (see FIG. 1).

Figure 4:
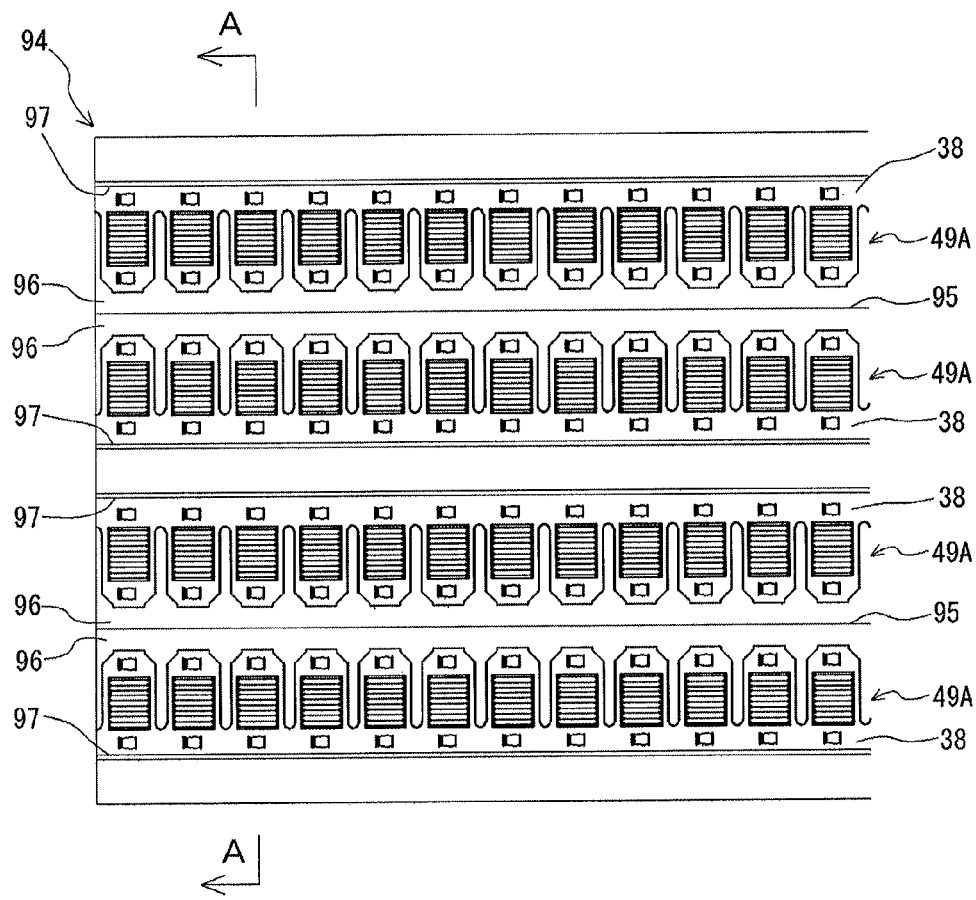
FIG. 4 is a plan view of a second metal strip guide.
Figure 5:
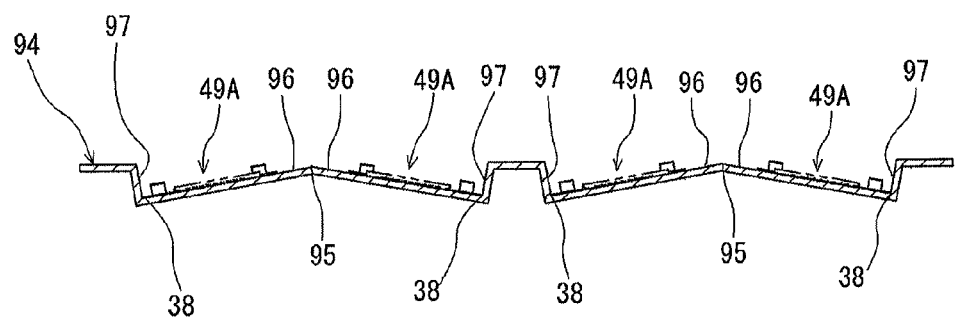
FIG. 5 is an end view taken along a line A-A in FIG. 4.

In the present embodiment, a second metal strip guide 94 is disposed at a position that is downstream of the first metal strip guide 91 of the form depicted in FIG. 3 and is immediately before the cutoff apparatus 60. FIG. 4 is a plan view of the second metal strip guide. FIG. 5 is a cross-sectional view taken along a line A-A in FIG. 4. The second metal strip guide 94 has inclined surfaces 96, which serve as paths, which have an apex 95 positioned on the same side as the openings in the cutaway portions 34 of the metal strips 49A of the product width, and which become lower toward the joining portions 38 sides, and wall portions 97 that are erected at lower end parts that are the front ends of the inclined surfaces 96. The width of the inclined surfaces 96 is formed so as to be wider than the width of the metal strips 49A of the product width. In the present embodiment, since four metal strips 49A of the product width are obtained from one metal strip 49, a second metal strip guide 94 that has two apexes 95 and four inclined surfaces 96 is used. Such second metal strip guide 94 can be formed by a known machining method such as bending or extrusion of a plate-like body made of metal or resin, for example.

Once the metal strips 49A of the product width fed out from the first metal strip guide 91 have been supplied onto the inclined surfaces 96, due to the effect of gravity alone, the metal strips 49A of the product width will slide down the inclined surfaces 96 toward the lower end parts of the inclined surfaces 96. The edges in the length direction of the joining portions 38 of the metal strips 49A of the product width (i.e., the edges of the metal strips 49A of the product width in which the cutaway portions 34 are not formed) will then contact the inner surfaces of the wall portions 97. Although there is no particular limitation on the angle of inclination a of the inclined surfaces 96 with respect to the horizontal plane, from the viewpoint of the effect of gravity when the metal strips 49A of the product width slide down the upper surfaces of the inclined surfaces 96 and the impact when the metal strips 49A of the product width slide down the inclined surfaces 96 and collide with the wall portions 97, the angle of inclination a of the inclined surfaces 96 with respect to the horizontal plane should preferably be in a range of 5° to 45°.

In this way, by having the metal strips 49A of the product width slide down the inclined surfaces 96 from the apex 95 sides of the inclined surfaces 96 in a state where the joining portions 38 are at the front, it is possible to prevent the cutaway portions 34 of the metal strips 49A of the product width from contacting anything and thereby possible to reliably prevent deformation of the metal strips 49A of the product width from occurring. Also, by having the joining portions 38 of the metal strips 49A of the product width contact the inner surfaces of the wall portions 97, the metal strips 49A of the product width are also guided in the conveying direction.

Figure 6:
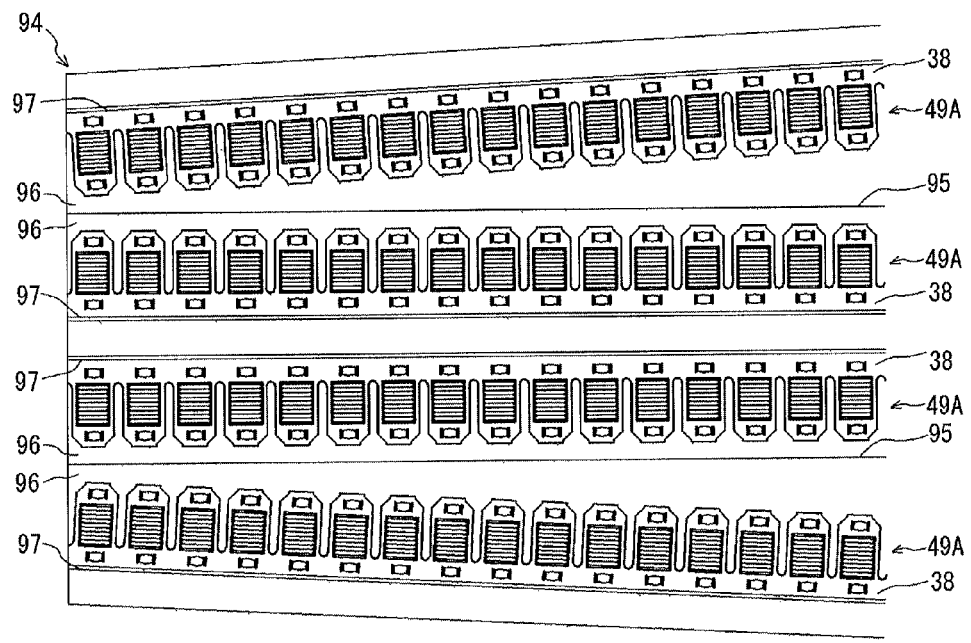
FIG. 6 is a plan view depicting another embodiment of the second metal strip guide.
Figure 7A:
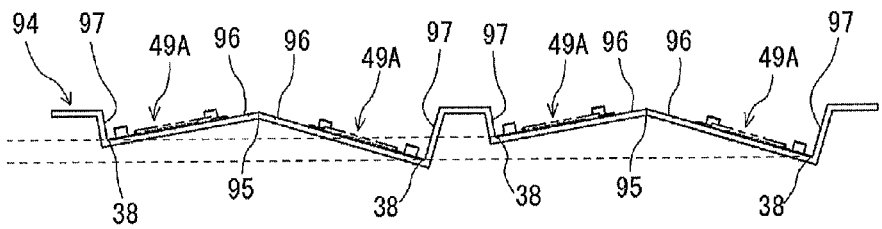
FIGS. 7A and 7B are end views depicting another embodiment of the second metal strip guide.
Figure 7B:
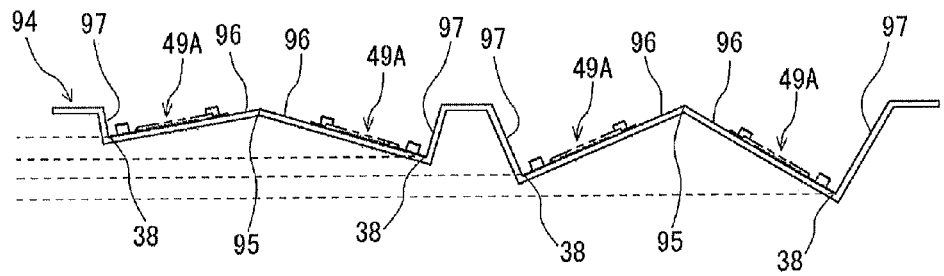

In addition, as depicted in FIG. 6, it is favorable to use a shape where the widths of some of the inclined surfaces 96 of the second metal strip guide 94 gradually increase towards the downstream side in the conveying direction of the metal strips 49A of the product width since this makes it possible to separate the metal strips 49A of the product width in the horizontal direction as the metal strips 49A of the product width approach the cutoff apparatus 60. Also, although the second metal strip guide 94 in the present embodiment is formed so that the heights of the conveyed-to positions (that is, the heights of the boundary positions between the inclined surfaces 96 and the wall portions 97) are equal for all of the inclined surfaces 96 as depicted in FIG. 5, it is also possible to set different heights for the conveyed-to positions (i.e., supplied height positions) of the metal strips 49A of the product width. More specifically, it is possible to use a construction of the second metal strip guide 94 where the inclined surfaces 96 are formed with the shape depicted in FIGS. 7A and 7B. Here, FIGS. 7A and 7B are views from an end surface depicting another embodiment of a metal strip guide, with the end surface position assumed to be a position corresponding to the position of the line A-A in FIG. 4.

By disposing the two types of metal strip guide 91, 94 as described above in the manufacturing apparatus 200 for flattened tube fins, it is possible, until the metal strips 49A of the product width cut out by the inter-row slit apparatus 58 are supplied to the cutoff apparatus 60, to keep the sides of the metal strips 49A of the product width where the cutaway portions 34 are open separate from one another in at least one of the horizontal direction and the height direction. By doing so, it is possible to reliably prevent damage to the sides where the cutaway portions 34 are open due to contact between the metal strips 49A of the product width. That is, it is possible to prevent a manufacturing loss due to contact between the metal strips 49A of the product width during conveying and thereby efficiently manufacture the flattened tube fins 30, which means that the flattened tube fins 30 can be supplied at low cost.

The metal strips 49A of the product width fed out from the inter-row slit apparatus 58 as described above can be conveyed to the cutoff apparatus 60 in a state where an appropriate interval is provided between the strips 49A. A feeding apparatus 62 that intermittently conveys the respective metal strips 49A of the product width in the conveying direction is provided inside the cutoff apparatus 60. As the construction of the feeding apparatus 62, a construction where it is possible to set the length of one feeding operation longer than with the construction of the feeding apparatus 50 provided at the downstream side of the press apparatus 48 is used. In the feeding apparatus 62, a conveying unit (not illustrated) that is capable of moving in the horizontal direction moves by a predetermined distance to pull the metal strips 49A of the product width from the press apparatus 48 side and push the metal strips 49 of the product width to the downstream side of the cutoff apparatus 60. On the upper surface of the conveying unit, a plurality of feeding pins 65 are disposed so as to protrude upward and are aligned in the horizontal direction in an equal number of rows to the number of metal strips 49A of the product width. The feeding pins 65 are inserted from below into the cutaway portions 34 formed in the respective metal strips 49A of the product width, and due to the cutaway portions 34 being pulled by the feeding pins 65, the metal strips 49A of the product width are fed out from an initial position to a conveyed position.

A cutting apparatus 66 is provided downstream (i.e., downstream in the conveying direction of the metal strips 49A of the product width) of the feeding apparatus 62 of the cutoff apparatus 60. The cutting apparatus 66 cuts the respective metal strips 49A of the product width into predetermined lengths to form the flattened tube fins 30. The cutting apparatus 66 includes an upper blade 68 disposed on the upper surface side of the metal strips 49A of the product width and a lower blade 69 disposed on the lower surface side of the metal strips 49A of the product width. By closing the upper blade 68 and the lower blade 69, the metal strips 49 of the product width are cut into predetermined lengths along the conveying direction to manufacture the flattened tube fins 30.

The construction and operation of a holding apparatus 70 and a stacker apparatus 80 disposed downstream of the cutoff apparatus 60 are depicted in FIGS. 8A to 10B. In FIGS. 8A to 10B, the left sides are plan views and the right sides are side views when looking from the direction X in the plan views (i.e., from the cutoff apparatus 60 side). Downstream of the cutoff apparatus 60 are provided the holding apparatus 70, which holds the metal strips 49A of the product width that have passed the mold apparatus 46 and the inter-row slit apparatus 58, guides the metal strips 49A of the product width in the conveying direction, and maintains the held state even after formation into flattened tube fins 30, and the stacker apparatus 80, which stacks the flattened tube fins 30 in the thickness direction of the fins 30.

As depicted in FIG. 8, the holding apparatus 70 includes a pair of holding members 71, 71 formed with U-shaped cross-sections that extend along the conveying direction of the metal strips 49A of the product width and fluid cylinders 72 provided as devices that move the holding members 71, 71 toward and away from one another between side positions to the sides of both edges in the width direction of the metal strips 49A of the product width and holding positions where the supports are capable of holding the metal strips 49A of the product width. The stacker apparatus 80 includes a base portion 82 on which a plurality of stacker pins 81 are erected and a raising/lowering device that raises the base portion 82 from a position below the holding members 71 to a position above the metal strips 49A of the product width and the flattened tube fins 30 held by the holding members 71. In the present embodiment, the raising/lowering device is constructed of a servo motor 84 and a ball screw 85 connected to the output shaft of the servo motor 84.

Figure 8A:
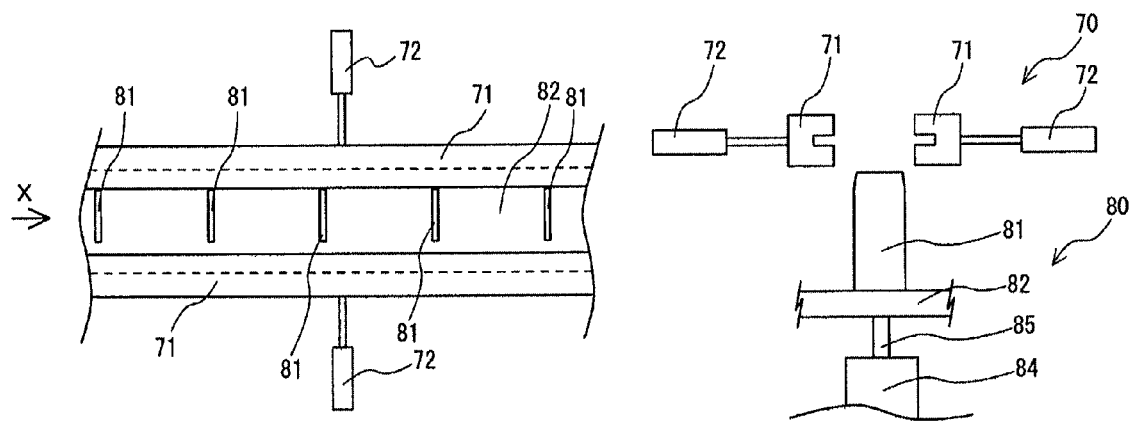
FIG. 8A is a plan view and FIG. 8B is a side view depicting the operation of a holding apparatus and a stacker apparatus.
Figure 8B:
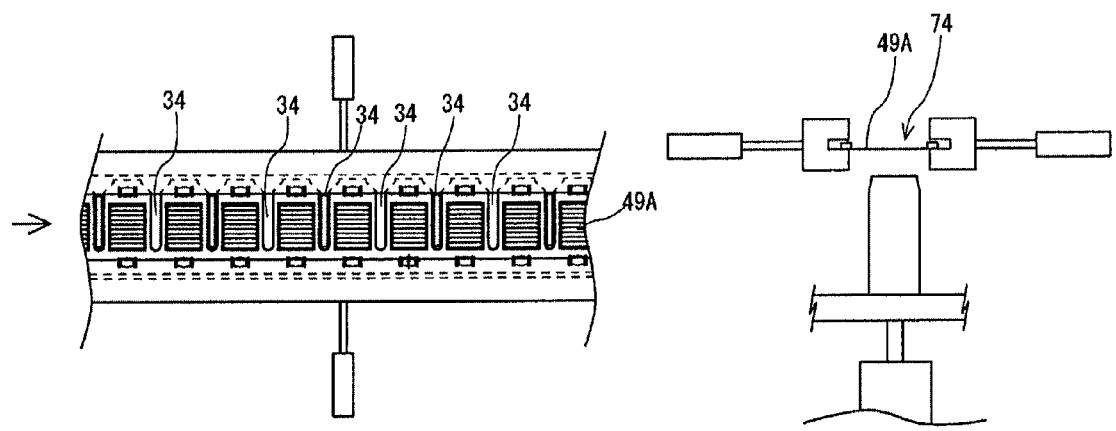

The fluid cylinders 72 and the servo motor 84 both carry out an extending and retracting operation in synchronization with the feeding out operation of the metal strips 49A of the product width by the feeding apparatus 62. More specifically before the metal strips 49A of the product width pass (i.e., are fed out) of a position of the upper blade 68 and the lower blade 69 of the cutting apparatus 66 of the cutoff apparatus 60, the fluid cylinders 72 extend as depicted in FIG. 8A so that the pair of holding members 71 are set at positions where both side edges in the width direction and the bottom surface of a metal strip 49A of the product width can be held inside the openings in the U-shaped parts of the holding members 71. Once the pair of holding members 71 have been set so that both side edges and the bottom surface of a metal strip 49A of the product width can be held by the holding members 71, as depicted in FIG. 8B, the metal strip 49A of the product width is fed out by the feeding apparatus 62. The metal strip 49A of the product width is guided in the conveying direction along a guide space 74 formed by the pair of holding members 71 disposed with their respective openings facing one another.

Figure 9A:
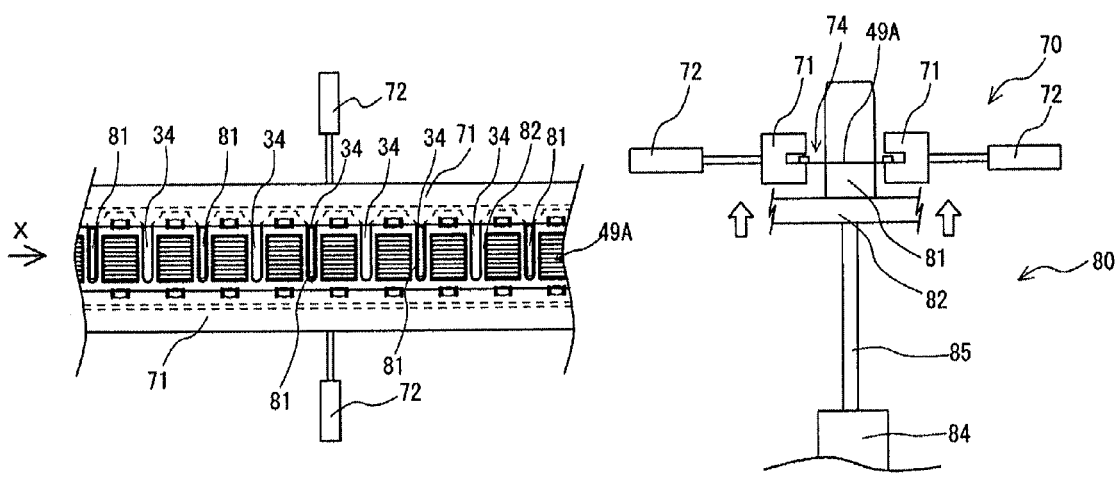
FIG. 9A is a plan view and FIG. 9B is a side view depicting the operation of the holding apparatus and the stacker apparatus.

When, as depicted in FIG. 8B, the metal strip 49A of the product width has been conveyed by the feeding apparatus 62 by a predetermined length to the guide space 74 of the pair of holding members 71, the feeding apparatus 62 temporarily stops. After this, as depicted in FIG. 9A, the servo motor 84 is driven to rotate the ball screw 85 so that the base portion 82 on which the stacker pins 81 are erected is moved closer to the pair of holding members 71 from below, resulting in the stacker pins 81 being inserted through the cutaway portions 34 of the metal strips 49A of the product width. Since the conveying distance (feeding out distance) of the metal strips 49A of the product width is decided in advance, the base portion 82 is capable of positioning the stacker pins 81 at the positions of the cutaway portions 34 in the metal strips 49A of the product width in advance.

Figure 9B:
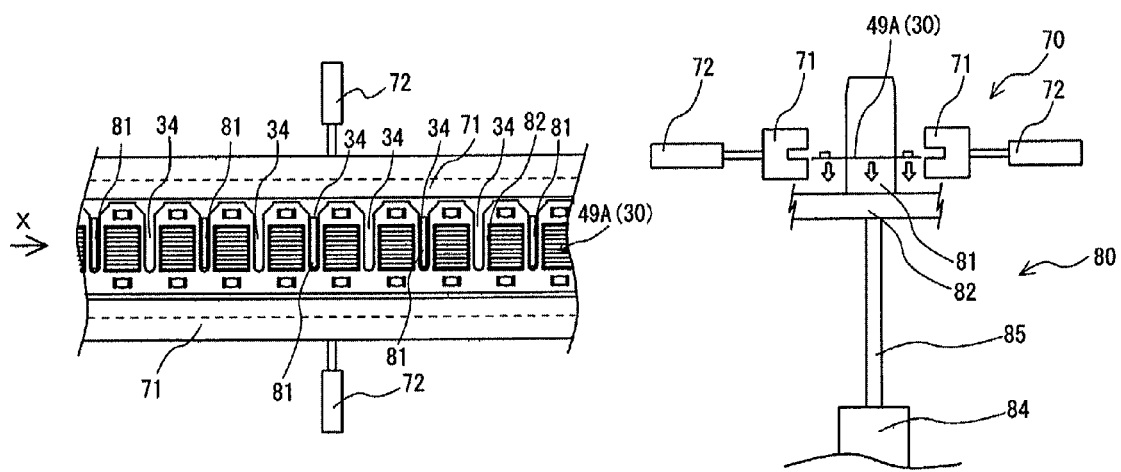

Once the stacker pins 81 have been inserted through the cutaway portions 34 of the metal strips 49A of the product width, the cutting apparatus 66 of the cutoff apparatus 60 carries out a cutting process at a predetermined position on the metal strips 49A of the product width to separate (i.e., cut) the metal strips 49A of the product width into flattened tube fins 30 (see FIG. 9B). During such cutting process on the metal strips 49A of the product width, the stacker pins 81 are inserted through the cutaway portions 34 so that the metal strips 49A of the product width are held in a positioned state, which means that the cutting process can be carried out accurately. That is, it is possible to obtain flattened tube fins 30 with high dimensional accuracy.

Figure 10A:
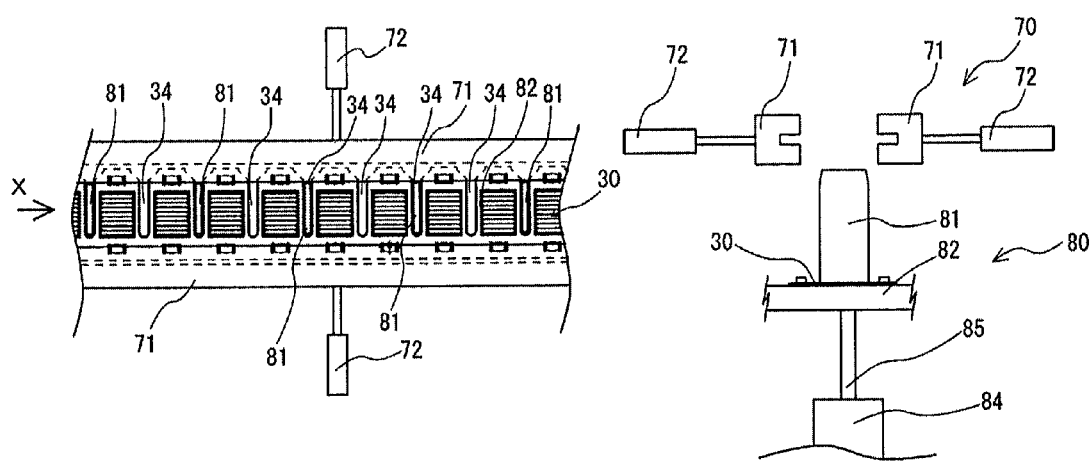
FIG. 10A is a plan view and FIG. 10B is a side view depicting the operation of a holding apparatus and a stacker apparatus.

The flattened tube fins 30 separated by the cutting apparatus 66 are held in the guide space 74 in a state where the stacker pins 81 are inserted through the cutaway portions 34 in the same way as before cutting. Once a metal strip 49A of the product width has been cut into a flattened tube fin 30 by the cutting apparatus 66, the fluid cylinders 72 retract as depicted in FIG. 10A so that both holding members 71 are withdrawn to the side positions to the side of both side edges in the width direction of the flattened tube fin 30. When the two holding members 71 have been withdrawn from the flattened tube fins 30, the flattened tube fin 30 is stacked on the base portion 82 along the stacker pins 81 that are inserted through the cutaway portions 34. When doing so, since there is very little distance between the upper surface of the base portion 82 and the held surface of the flattened tube fin 30, the flattened tube fin 30 can be orderly stacked on the base portion 82.

Figure 10B:
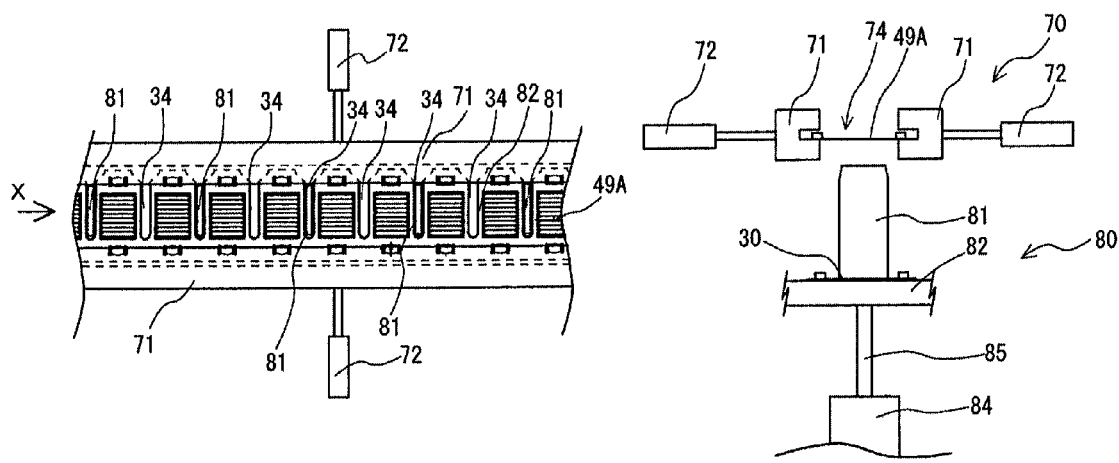

After the flattened tube fin 30 has been stacked in the thickness direction on the upper surface of the base portion 82, as depicted in FIG. 10B, by driving the servo motor 84 to rotate the ball screw 85, the base portion 82 is lowered to a position below the pair of holding members 71. At the same time or after the base portion 82 has been lowered, the fluid cylinders 72 extend to move the pair of holding members 71 close to each other to form the guide space 74 that guides, in the conveying direction, the metal strip 49A of the product width that is fed out by the feeding apparatus 62 and protrudes from the downstream side in the conveying direction of the cutoff apparatus 60. After the guide space 74 has been formed again, the operation of the feeding apparatus 62 recommences and the metal strip 49A of the product width is fed into the guide space 74. By repeating the operation described above, the flattened tube fins 30 produced by cutting a metal strip 49A of the product width can be orderly stacked at predetermined intervals.

Figure 11:
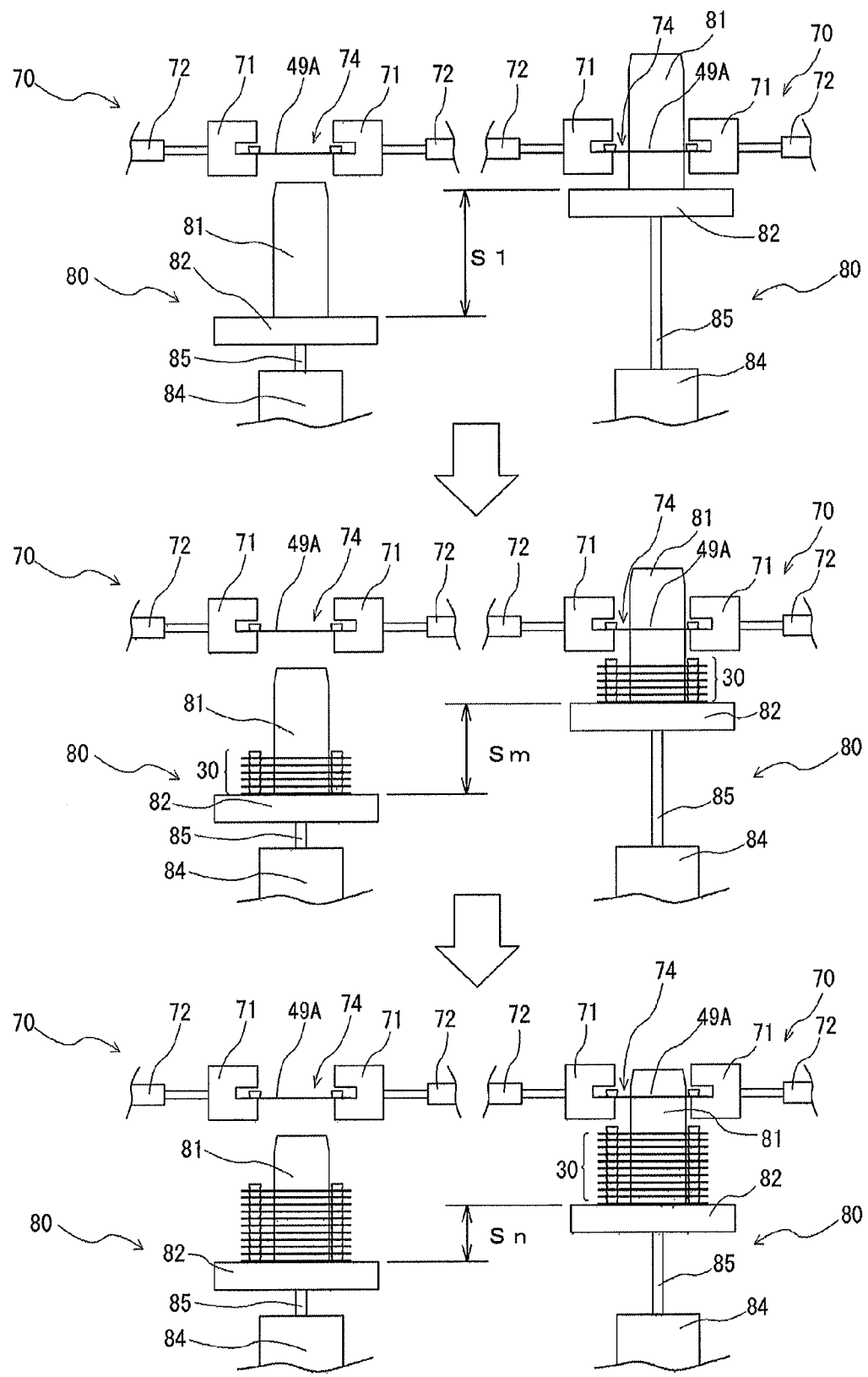
FIG. 11 is a diagram useful in explaining changes in a raising amount of the stacker apparatus.
Figure 12:
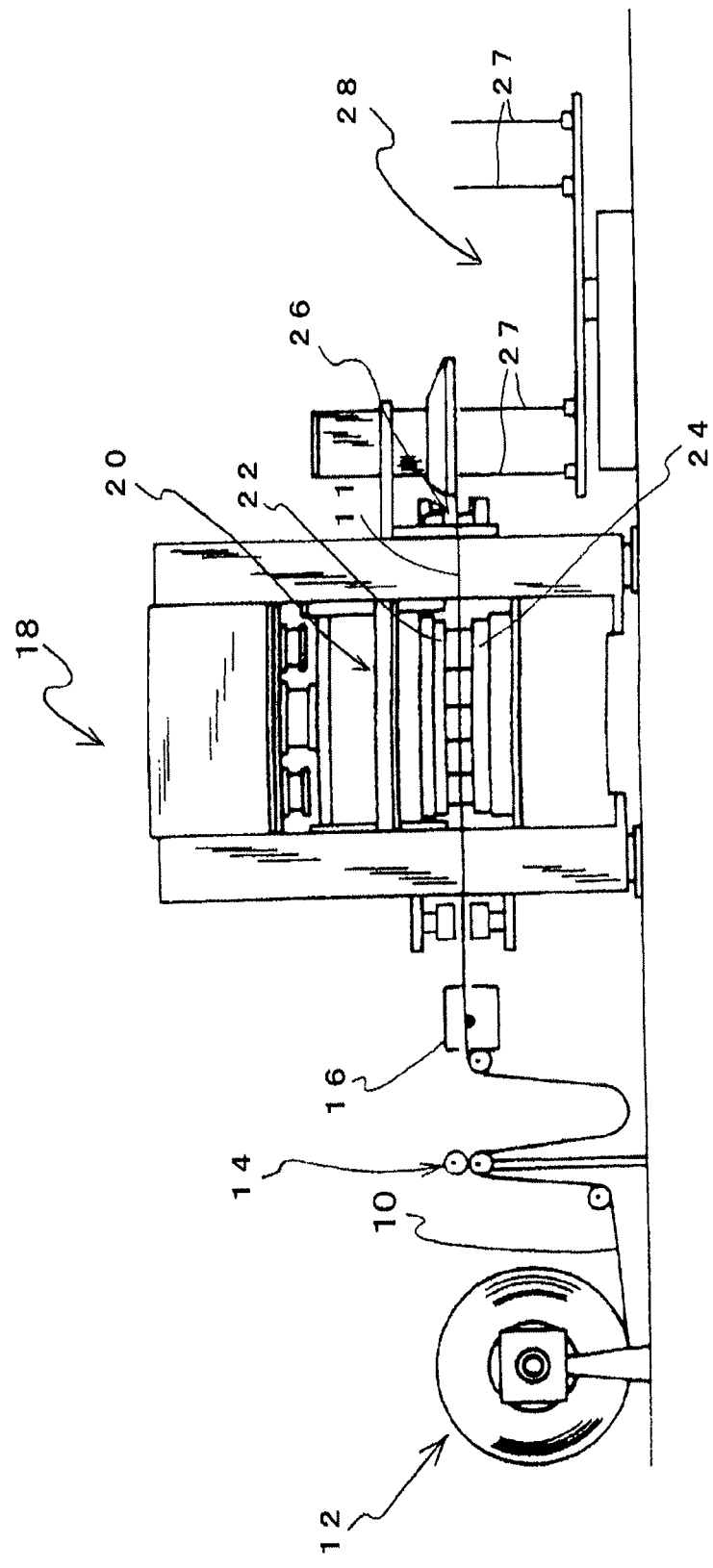
FIG. 12 is a diagram depicting the overall construction of a manufacturing apparatus for flattened tube fins according to the background art.
Figure 13A:
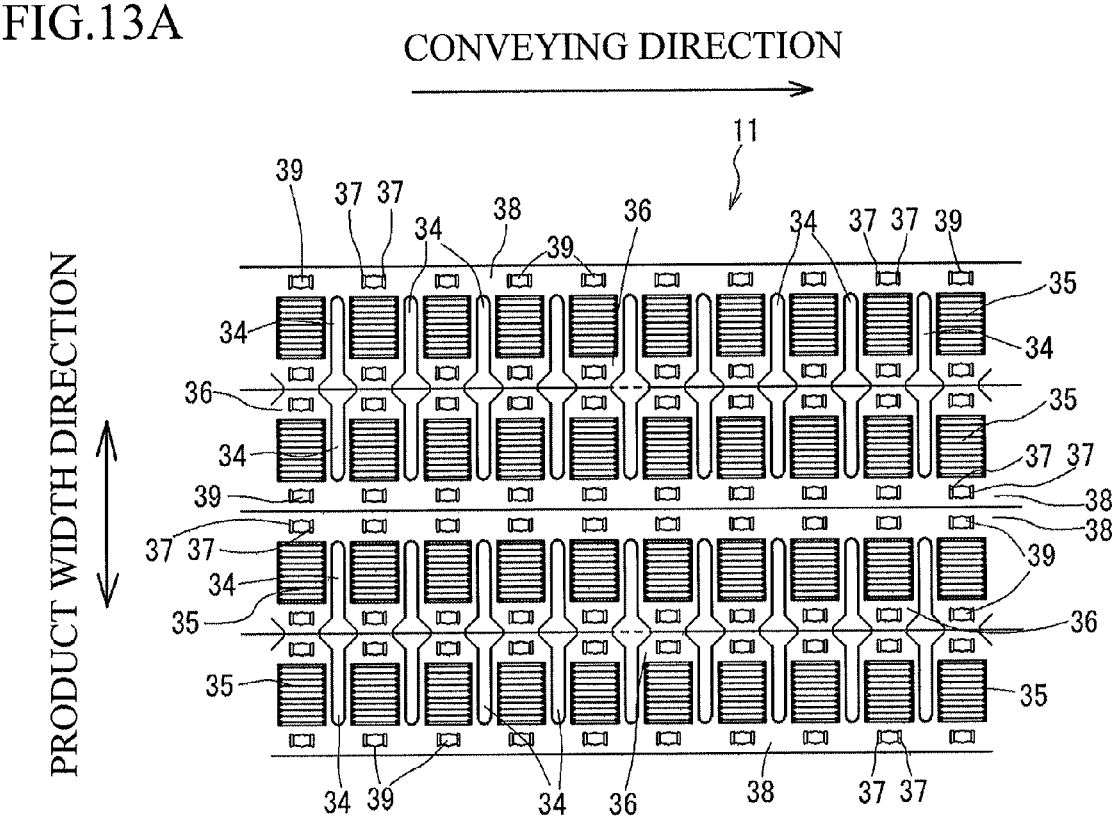
FIG. 13A is a plan view of a metal strip and FIG. 13B is a plan view of a flattened tube fin obtained by separating the metal strip.
Figure 13B:
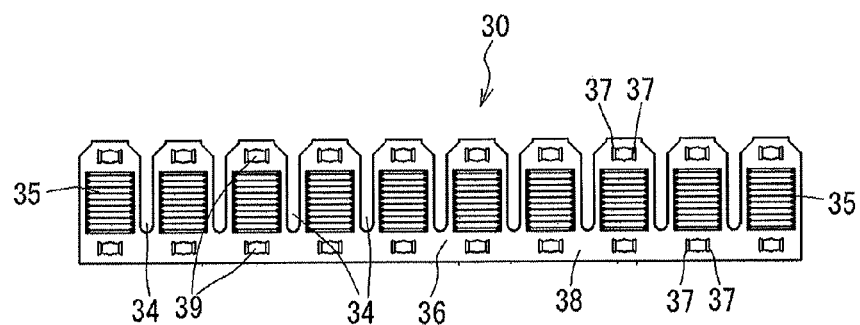

The series of operations of the stacker apparatus 80 described above is controlled by a control unit 100. As the control unit 100, it is possible to store a control process in a storage device and to use a computer or the like including a central processing unit (CPU) that carries out operations based on the control process. As depicted in FIG. 11, the control unit 100 controls the driving of the servo motor 84 so that the raising stroke (S1, Sm, Sn) of the base portion 82 (i.e., the stacker apparatus) is gradually reduced as the number of flattened tube fins 30 stacked on the base portion 82 increases (when advancing from the top toward the bottom in the drawing). Note that the range in which the holding members 71 move toward and away from the metal strips 49A of the product width is always constant.

Once the number of flattened tube fins 30 stacked on the base portion 82 reaches a predetermined number, the flattened tube fins 30 stacked on the base portion 82 are transferred from the base portion 82 by a transfer apparatus, not illustrated. Even after transfer to the transfer apparatus, it is possible for a predetermined stacking interval to be maintained between the flattened tube fins 30 by the folded-up portions 37, which facilitates handling of the flattened tube fins 30 during a removal process or the like for the flattened tube fins 30. Once the flattened tube fins 30 have been transferred from the base portion 82 to the transfer apparatus, the driving amount of the servo motor 84 is reset so that the raising stroke of the base portion 82 becomes the initial value S1.

With the construction of the holding apparatus 70 according to the present embodiment, since the metal strips 49A of the product width before the cutoff process are conveyed while sliding on the inner bottom surface of the guide space 74, there is a large reduction in friction during conveying compared to a method that uses air chucking. By doing so, it is possible to improve the manufacturing yield without the metal strips 49A of the product width buckling during conveying due to friction caused by air chucking or due to the feeding out force applied in the conveying direction.

Since the distance (i.e., difference in height) from the position where the flattened tube fins 30 are held by the guide space 74 to the upper surface position of the base portion 82 on which the stacker pins 81 are erected is extremely short, it is possible to orderly stack flattened tube fins 30 whose weight balance is off center. By doing so, since a straightening process for the stacked state of the flattened tube fins 30 is unnecessary when the flattened tube fins 30 are transferred from the base portion 82 to a transfer apparatus, not illustrated, it is possible to reduce the take time and to reduce the manufacturing cost of the flattened tube fins 30.

Although the present invention has been described above by way of the preferred embodiments, the present invention is not limited to such embodiments and it should be obvious that various modifications may be implemented without departing from the scope of the invention. As one example, the metal strips 49 (the flattened tube fins 30) are not limited to the construction depicted in FIG. 2, and it is possible to use other constructions with different positions, shapes, and numbers of the louvers 35 and/or the folded-up portions 37.

Also, although an example configuration where the metal strip guides 90 are constructed by disposing the first metal strip guide 91 at a position immediately below the inter-row slit apparatus 58 and the second metal strip guide 94 is disposed at a position immediately above the cutoff apparatus 60 has been described in the above embodiment, the metal strip guides 90 are not limited to such configuration. As one example, it is possible to construct the metal strip guides 90 from only one of the first metal strip guide 91 and the second metal strip guide 94 or to use a configuration where the first metal strip guide 91 and the second metal strip guide 94 are arranged in the opposite order. The second metal strip guide 94 may be constructed by forming the inclined surfaces 96 with the apexes 95 and the wall portions 97 in the same way as in the embodiment described above by milling a solid body.

In addition, it is possible to use other known constructions for the press apparatus 48, the feeding apparatus 50, the cutoff apparatus 60, the holding apparatus 70, and the stacker apparatus 80 that differ to the constructions in the embodiment described above.

What is claimed is:

1. A manufacturing apparatus for manufacturing flattened tube fins in which cutaway portions, into which flattened tubes for heat exchanging are inserted, are formed from one side toward the other side in a width direction, the manufacturing apparatus comprising:
    a press apparatus equipped with a mold apparatus that forms the cutaway portions in an unmachined thin plate of metal to produce a metal strip;
    an inter-row slit apparatus for cutting the metal strip, in which the cutaway portions have been formed, into predetermined widths to form a plurality of metal strips of a product width that are arranged in the width direction;
    a cutoff apparatus that cuts each of the plurality of metal strips of the product width into predetermined lengths to obtain flattened tube fins; and
    a metal strip guide which is disposed between the inter-row slit apparatus and the cutoff apparatus and supplies the respective metal strips of the product width that have been formed by the inter-row slit apparatus to the cutoff apparatus in a state where the metal strips are separated from one another,
    wherein the metal strip guide includes:
    paths that are formed on inclined surfaces provided with an apex on a side of the metal strips of the product width formed by the inter-row slit apparatus where the cutaway portions are formed and inclined downward from the apex in directions that are perpendicular to a supplying direction of the metal strips of the product width, the inclined surfaces being formed wider than the product width of the metal strips of the product width; and
    wall portions that extend from ends in a width direction of the paths.

2. The manufacturing apparatus for manufacturing flattened tube fins according to claim 1,
    wherein the metal strip guide supplies the metal strips of the product width to the cutoff apparatus in a state where sides of the metal strips where the cutaway portions are open are separated from one another.

3. The manufacturing apparatus for manufacturing flattened tube fins according to claim 1,
    wherein the wall portions are provided at positions that contact edges of the metal strips of the product width where the cutaway portions are not formed.

4. The manufacturing apparatus for manufacturing flattened tube fins according to claim 1,
    wherein an angle of inclination of the inclined surfaces with respect to a horizontal plane is in a range of 5° to 45°.

5. The manufacturing apparatus for manufacturing flattened tube fins according to claim 1,
    wherein the metal strip guide supplies the metal strips of the product width to the cutoff apparatus at positions that are separated in at least one direction out of a height direction and a width direction, for the cutoff apparatus.

6. The manufacturing apparatus for manufacturing flattened tube fins according to claim 1,
    wherein a plurality of the metal strip guides are provided.

* * * * *